United States Patent
Sawano

(10) Patent No.: US 6,819,447 B1
(45) Date of Patent: Nov. 16, 2004

(54) PRINT CONTROL APPARATUS, PRINT CONTROL METHOD, AND MEMORY MEDIUM

(75) Inventor: Yasuaki Sawano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/541,503

(22) Filed: Apr. 3, 2000

(30) Foreign Application Priority Data

| Apr. 8, 1999 | (JP) | ............................................ | 11-101348 |
| Jun. 29, 1999 | (JP) | ............................................ | 11-184355 |
| Mar. 17, 2000 | (JP) | ...................................... | 2000-075895 |

(51) Int. Cl.⁷ ............................................... G06F 15/00

(52) U.S. Cl. ....................... 358/1.16; 358/1.15; 358/296

(58) Field of Search ............................... 358/1.16, 1.15, 358/1.13, 1.14, 1.9, 504, 536, 530, 296, 409

(56) References Cited

U.S. PATENT DOCUMENTS 6,606,165 B1 * 8/2003 Barry et al. .................. 358/1.9

* cited by examiner

*Primary Examiner*—Twyler Lamb
(74) *Attorney, Agent, or Firm*—Fitzpatrick, Cella, Harper & Scinto

(57) ABSTRACT

It is an object of the invention to prevent the occurrence of an overrun in a printer having a plurality of printer engines for color printing. In a print control apparatus for converting print data of a plurality of bands constructing one page into a display list and further developing the display list into bit map data, a time that is required when the display list is developed to the bit map data is predicted every band and every color, priorities are allocated every band on the basis of the predicted development time so as to allocate a high priority to the band in which the predicted development time of each color is long and stored in a priority retainer 54. When at least two of hard renderers of each color have requested to obtain the display list of the same band, an access request selector 51 selects one of a plurality of obtaining requests of the display list with reference to the priorities stored in the priority retainer 54.

30 Claims, 8 Drawing Sheets

|        | Y   | M   | C   | K   |
|--------|-----|-----|-----|-----|
| BAND 1 | 0.6 | 0.7 | 0.8 | 1.0 |
| BAND 2 | 0.8 | 0.5 | 0.7 | 0.9 |
| BAND 3 | 0.9 | 1.0 | 0.7 | 0.8 |

FIG. 7

|        | Y    | M    | C    | K    |
|--------|------|------|------|------|
| BAND 1 | 1.05 | 1.00 | 0.95 | 1.00 |
| BAND 2 | 1.15 | 0.80 | 0.85 | 0.90 |
| BAND 3 | 1.35 | 1.30 | 0.85 | 0.80 |

FIG. 8

| COLOR / BAND | Y   | M   | C   | K   |
|--------------|-----|-----|-----|-----|
| BAND 1       | 1.1 | 0.9 | 0.8 | 0.6 |
| BAND 2       | 1.5 | 1.2 | 1.4 | 1.3 |
| BAND 3       | 0.9 | 1.0 | 1.2 | 1.4 |

(SEC)

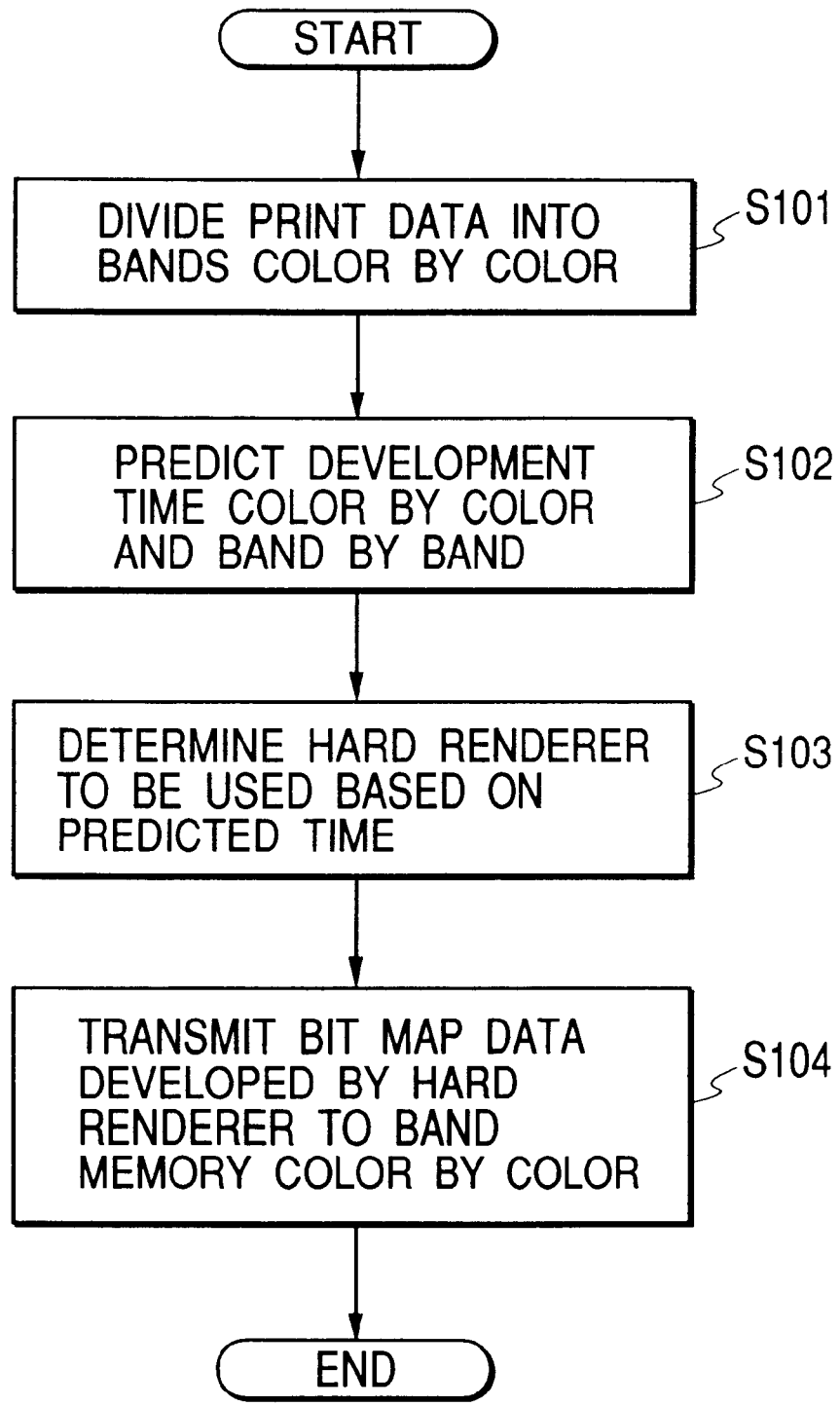

PRINT CONTROL APPARATUS, PRINT CONTROL METHOD, AND MEMORY MEDIUM

BACKGROUND OF THE INVENTION

1. Field of the Invention

The invention relates to a print control apparatus, a print control method, and a memory medium. More particularly, the invention relates to a print control apparatus for controlling the operation of a printer having a plurality of dedicated printer engines for a plurality of colors, dividing print data described by a page description language into a plurality of bands page by page, converting the print data of each band to a display list, and further developing the display list to bit map data. The invention also relates to a print control method which is applied to such a print control apparatus and a memory medium in which a program for executing such a print control method has been stored.

2. Related Background Art

Hitherto, with respect to a printer for dividing print data of one page into a plurality of bands and performing a bit map developing process every band, particularly, a printer of a tandem system having a dedicated printer engine for each of yellow, magenta, cyan, and black.

FIG. 2 is a block diagram showing a schematic construction of a conventional printer apparatus such as a tandem system color printer or the like.

In FIG. 2, reference numeral 17 denotes a host computer having a printer driver 18 for controlling a printer 11. Reference numeral 11 denotes the printer of the tandem system and has a controller 12 and printer engines 13, 14, 15, and 16. The printer engines 13, 14, 15, and 16 execute printing in yellow (Y), magenta (M), cyan (C), and black (K).

Print data formed by the printer driver 18 of the host computer is transmitted to the printer 11 through a communication medium 19 such as a network or the like and printed.

In such a conventional printer, print data of one page which is received from the host computer is developed to bit map data and, when the formation of the bit map data of one page per color is finished, an image is formed onto a recording medium in each printer engine.

In a conventional printer of a system other than the tandem system, mainly for the purpose of saving a memory and improving a printing speed, print data of one page which is received from the host computer 17 is divided into a plurality of bands, a display list is formed every band, and upon printing, the development of the display list to the bit map data and a shipping of the bit map data (data transfer to a printer engine) are simultaneously performed.

Since the printer cannot stop a paper conveyance during the operation, the shipping has to be continuously performed with respect to the data of one page. Therefore, until the end of shipping of a certain band, the bit map data of the next band has to be prepared. When the shipping of the certain band is finished, if the bit map data of the next band is not prepared, a correct print result cannot be obtained. This state is called "overrun". Now, for example, assuming that a printing speed of the printer engine is equal to 16 pages/min, it is necessary to form bit map data of one page within 3.75 seconds. In case of dividing one page into three bands and processing them, bit map data of one band has to be formed within 1.25 seconds. If the time exceeds this time, an overrun occurs.

If it is determined that the overrun occurs as a result of prediction based on a development prediction time regarding a certain band, a display list is previously developed to bit map data and stored for such a band before the printing is started. Thus, since the development of the band to the bit map data is not performed at the time of shipping of the bit map data, the overrun can be prevented.

In case of the system instead of the tandem system, since it is sufficient to sequentially form images onto a transfer material or an intermediate transfer material in the order of YMCK every color, a controller similar to a monochromatic printer can be used.

In the printer of the tandem system, however, in order to further realize a high speed, since it is necessary to simultaneously form an image of the same page by printer engines of a plurality of colors or form images of different pages onto a recording medium, bit map data of each color is previously developed in a page memory as mentioned above and, after that, the printing process is started.

In the conventional printer of the tandem system as mentioned above, after completion of the development of the bit map data of one page, the paper feed is performed and the printing process is performed. Therefore, although the recording time according to the tandem system can be reduced, there is a problem that it takes time for the developing process and it is difficult to improve the performance. Therefore, a method whereby a printing system for performing a band process is used for the printer of the tandem system is considered.

To perform the band process in the printer of the tandem system, it is necessary to simultaneously form images of the bands of the respective colors. Therefore, when it takes long time for development of a certain color, even if there is a surplus time for the developing processes of the other colors, an overrun occurs. There is, consequently, a problem that only a print result of a reduced resolution can be obtained.

For the developing process, a hard renderer of each color simultaneously issues an access request to the display list, an arbitrator for arbitrating the access requests is necessary.

FIG. 4 is a block diagram showing an example of an arbitrator which is necessary when the band process is applied to the printer of the tandem system.

In FIG. 4, reference numeral 51 denotes an access request selector for selecting one of access request signals (REQ-Y, REQ-M, REQ-C, REQ-K) of Y, M, C, and K components; 52 an address selector for selecting one of request destination addresses (ADDRESS-Y, ADDRESS-M, ADDRESS-C, ADDRESS-K) corresponding to the access request signal selected by the access request selector 51; and 53 a data transmitter for returning data (DATA) from a request destination regarding the access request signal selected by the access request selector 51 to a requesting source and forming a signal (DTE: Data Enable) showing the validity of the data. A priority has been set to the access request selector 51 for each access request signal. The access request selector 51 selects the access request signal in accordance with this priority.

However, if the band process is simply realized by the printer of the tandem system, there is a problem that in the hard renderer corresponding to the access request signal of a low priority, there is a possibility that the overrun occurs even in the band in which it is presumed that no overrun would occur on the basis of a development prediction time.

That is, since the access priority has fixedly been determined in the conventional access request selector 51, when access factors compete (when interruption processing request have simultaneously been generated), the process of the hard renderer of a low priority is made to wait irrespective of the development prediction time. This is because, however, if the hard renderer of a low priority takes the longest time for development of bit map data, a continuation time during which this hard renderer is concerned with the development becomes longer than the prediction time due to the waiting, so that there is a possibility of the occurrence of the overrun which ought not to have occurred according to the prediction.

Although it is also possible to allow a calculating equation of the prediction time to have a sufficient margin so as not to cause the overrun, if such a method is used, the number of bands in which it is determined that the overrun will occur increases, the number of bands which are previously developed to the bit map data increases, resulting in deterioration of the performance.

Although it is also possible that a dedicated display list is formed in each of the hard renderer of each color and stored into each dedicated RAM so as not to compete the access requests, there is a problem that such a method is improper from a viewpoint of saving the memory.

SUMMARY OF THE INVENTION

The invention is made in consideration of the above problems and it is an object of the invention to provide a print control apparatus, a print control method, and a memory medium, which can prevent the occurrence of an overrun in a printer having a plurality of printer engines for color printing.

To accomplish the above object, according to the invention, there is provided a print control apparatus for forming bit map data to be outputted to a plurality of printer engines corresponding to a plurality of colors, comprising: analyzing means for dividing print data described by a page description language into a plurality of bands and forming a display list of an intermediate data format into a memory every band; development time calculating means for calculating a development prediction time which is required when developing into the bit map data on the basis of the display list every band and every color; a plurality of developing means each for developing into the bit map data band by band on the basis of the display list; and arbitrating means for, in the case where access requests to the memory in which the display lists have been stored are issued from at least two of the plurality of developing means, arbitrating the access requests in accordance with priorities for the access requests to the memory which are determined on the basis of the development prediction time calculated by the development time calculating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram showing a result obtained by considering an image forming order to the development prediction time of each band and each color in the embodiment;

FIG. 8 is a diagram showing a prediction result of a development time of print data of each band in the embodiment;

FIG. 11 is a flowchart showing a processing flow for processes which are executed by a printer of the embodiment.

DETAILED DESCRIPTION OF THE PREFERRED EMBODIMENT

A preferred embodiment of the invention will now be described in detail hereinbelow with reference to the drawings.

Figure 2:
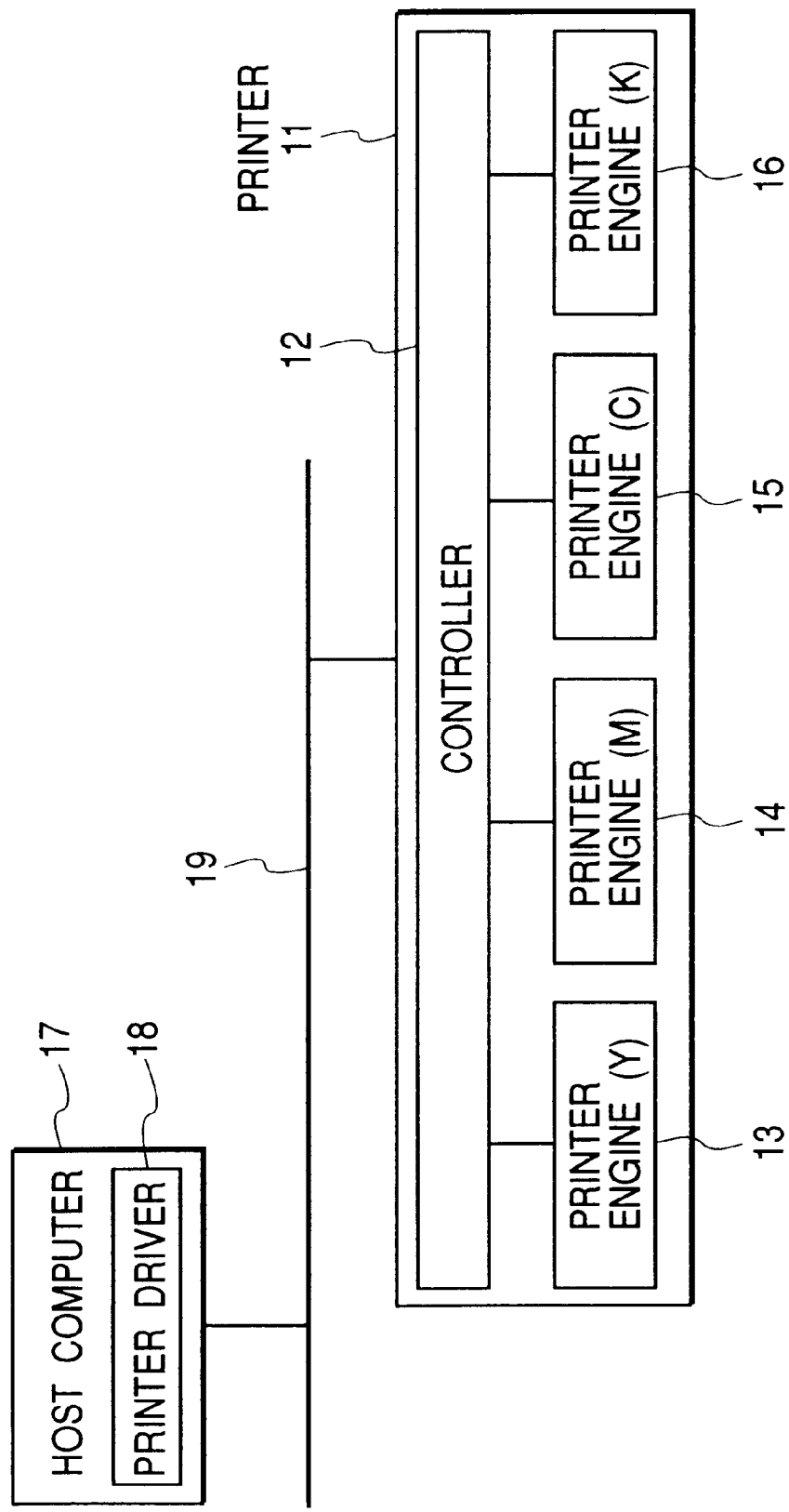
FIG. 2 is a block diagram showing a schematic construction of a printer such as a conventional tandem system color printer or the like having dedicated printer engines for yellow, magenta, cyan, and black.
Figure 3:
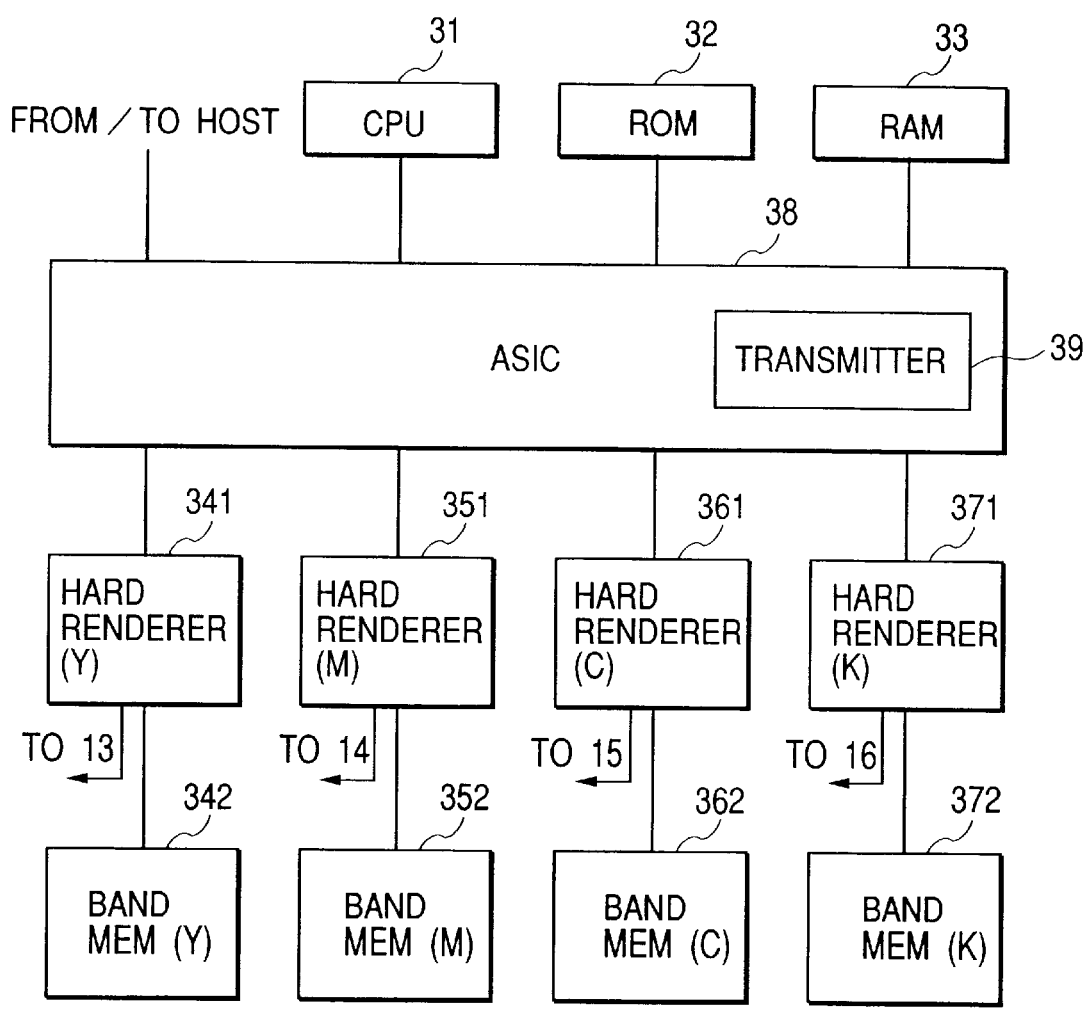
FIG. 3 is a block diagram showing an internal construction of a controller 12 in FIG. 2.

FIG. 3 is a block diagram showing an internal construction of the controller 12 at the time when a conventional band process is applied to the printer of the tandem system in FIG. 2.

In FIG. 3, reference numeral 31 denotes a CPU for unitedly controlling a developing process of image data on the basis of a control program stored in an ROM 32. Various data such as font information and the like has also been stored in the ROM 32. Reference numeral 33 denotes an RAM which functions as a work memory of the CPU 31 and stores print data which is sent from the host computer 17 and described by a page description language, the display list which is formed in the printer 11 by analyzing the print data, and the like. Reference numeral 38 denotes an ASIC which is a circuit for executing various controls of the printer.

Reference numerals 341, 351, 361, and 371 denote hard renderers each for developing the display list stored in the RAM 33 into bit map data. The hard renderers have charges of Y, M, C, and K components and transmit the bit map data to the printer engines 13, 14, 15, and 16, respectively. Reference numerals 342, 352, 362, and 372 denote band memories for storing the bit map data of the Y, M, C, and K components, respectively. The ASIC 38 has a transmitter 39 for designating into which band memory the bit map data developed by the hard renderer should be stored.

The processing operation of the printer of the invention will now be described with reference to FIGS. 2 and 3.

When the print data which is received from the host computer 17 is analyzed and the display list is formed, a development time is predicted and the development time of each band is calculated. That is, in FIG. 3, an equation to calculate a development time which is required to develop the display list to the bit map data depending on the kind (character, image, run length, etc.) or size of the print data is stored in the ROM 32 or the like beforehand. The print data described by the page description language is stored from the host computer (not shown) into the RAM 33. Subsequently, the CPU 31 divides the print data into a plurality of bands page by page and converts the print data which is drawn in each band to a display list. In this instance, the CPU 31 adds the development time of the display list which is formed every drawing object by using the calculating equation previously stored in the ROM 32 and predicts a development time necessary for developing the display list to the bit map data every band and every color. The development time which is predicted is equal to the time which is required when the hard renderers 341, 351, 361, and 371 respectively convert the display list of one band to the bit map data.

If it is determined that the overrun occurs as a result of presumption based on the development prediction time with respect to a certain band, the hard renderers 341, 351, 361, and 371 respectively convert the display list to the bit map data prior to starting the printing and store them into the RAM 33. Therefore, since the bit map data of the band is not developed upon shipping the bit map data, the overrun can be prevented.

When the display list is read out from the RAM 33, when the bit map data is written into the band memories 342, 352, 362, and 372, respectively, or the like, such reading process and writing process are individually executed every color of the Y, M, C, and K components. However, there is a possibility that the process of each color simultaneously generates an interrupting request (access request) and these requests compete. When such a case occurs, which interruption (access) is preferentially performed is decided by the arbitrator in the ASIC 38 in FIG. 3.

Figure 1:
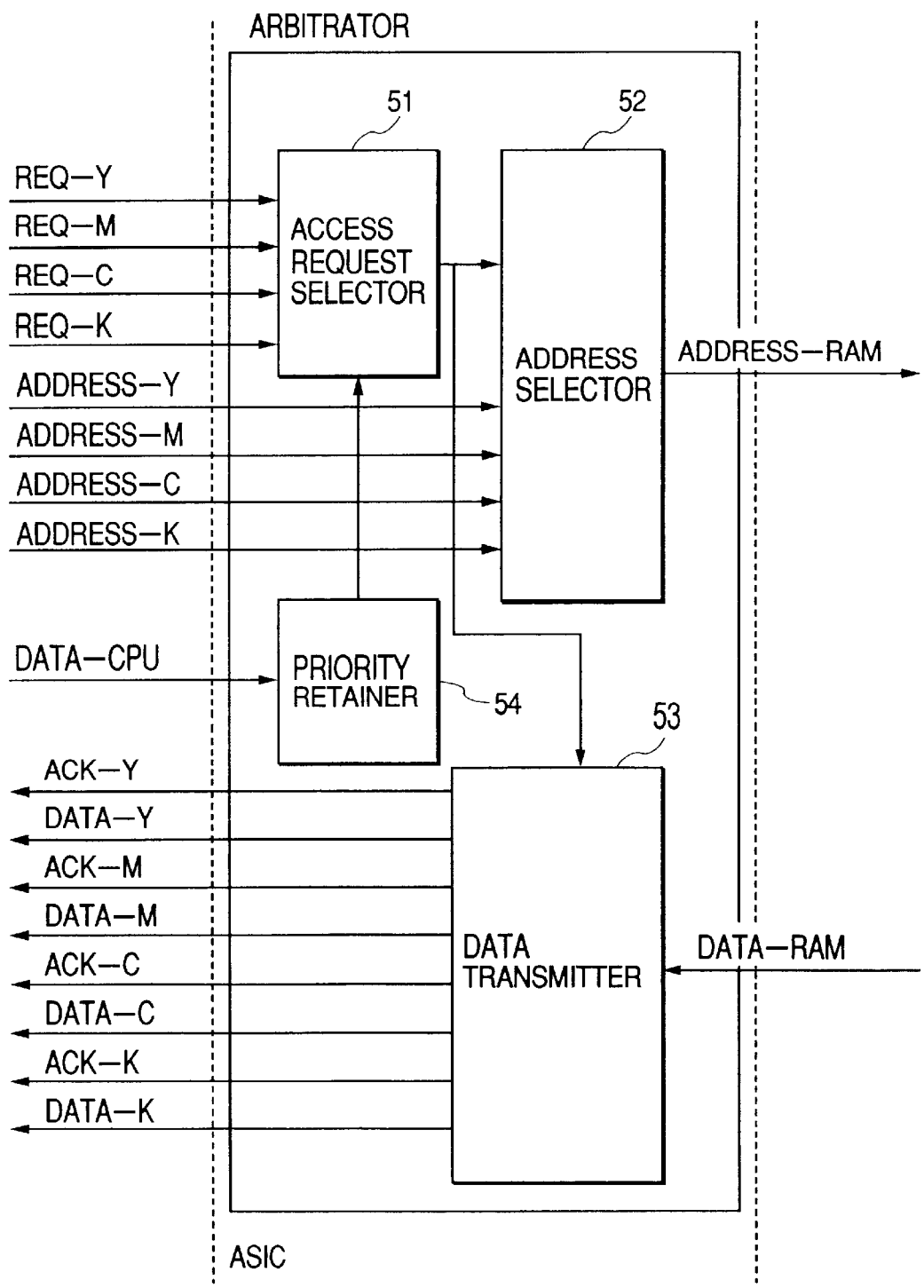
FIG. 1 is a block diagram showing a construction of an access arbitrator of a printer according to the invention.
Figure 4:
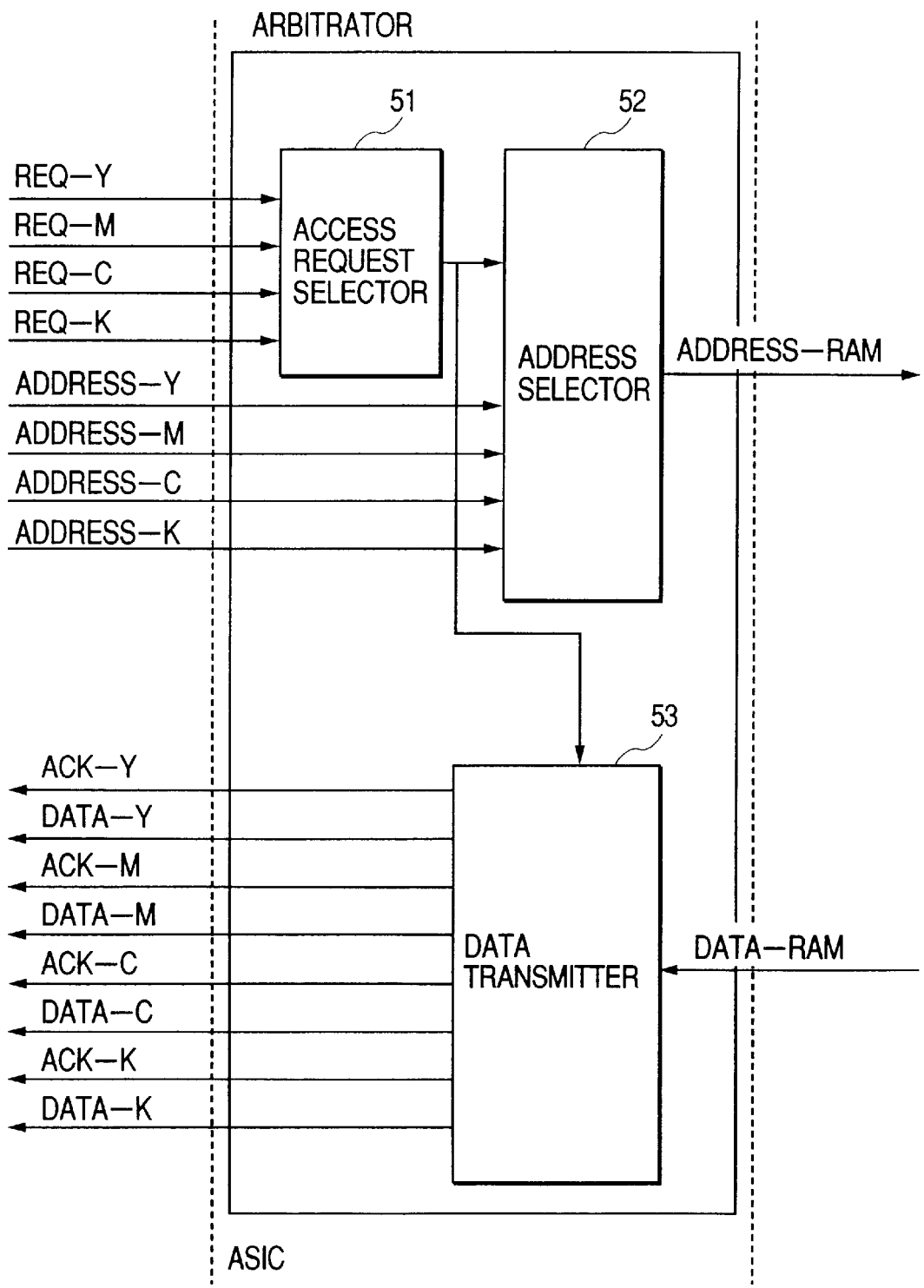
FIG. 4 is a block diagram showing an example of a conventional arbitrator.

FIG. 1 is a block diagram showing a construction of an access arbitrator of a printer according to the invention. Since the construction of the access arbitrator of the printer according to the invention is fundamentally the same as that of the conventional arbitrator shown in FIG. 4, the same constructing portions are designated by the same reference numerals and their descriptions are omitted.

In FIG. 1, reference numeral 54 denotes a priority retainer for retaining priority data responsive to the access request and this circuit will be described in detail hereinlater.

The processing operation of the printer including the above circuit is as follows.

The print data which is transmitted from the host computer and described by the page description language is stored in the RAM 33. The CPU 31 divides the print data described by the page description language and stored in the RAM 33 every band and forms a display list on the basis of the print data every band. The display list is intermediate data for interpreting the print data of the page description language and making the conversion to the bit map data easy upon shipping (process for outputting the video signal to the printer engine). When the display list as intermediate data is formed, a development prediction time of every band and every color is calculated from a predicting equation (equation to obtain the development time from the drawing object and the size) of the development time of each drawing object (character, image, run length, etc.) of the intermediate data stored in the ROM 32.

In the embodiment, in the case where the printing speed of the printer is equal to 16 pages/min on the assumption that the paper size is equal to A4 and the paper is positioned in the landscape direction and one page in the normal band mode is divided into three bands, a reference development time per band is equal to 1.25 seconds. In the high speed band mode, one page is divided into six bands and a reference development time per band is equal to 0.625 second. In the high speed band mode, a band width to form the display list is likewise equal to a size obtained by dividing one page into six bands and the development prediction time is calculated every band.

The CPU 31 compares the development prediction time of each band with the reference development time. With respect to the band whose development prediction time is longer than the reference development time, the CPU 31 previously performs the development to the bit map data for this band prior to starting the printing in a manner similar to the conventional one. When the development prediction time lies within the reference development time, the access priorities of the hard renderers 341, 351, 361, and 371 are decided every band. The access priorities are determined, for example, by a method whereby the priority in the case where the predicted time of each color in the same band is equal to the reference development time is set to the highest priority and the priority is lowered by one level each time the time is shortened by 0.1 second. In this manner, the CPU 31 decides the access priority every color in each band and stores the result into the RAM 33. When the developing process of each band by each hard renderer is started, the access priorities are written and held into the priority retainer by a DATA-CPU signal.

Figures 5, 6:
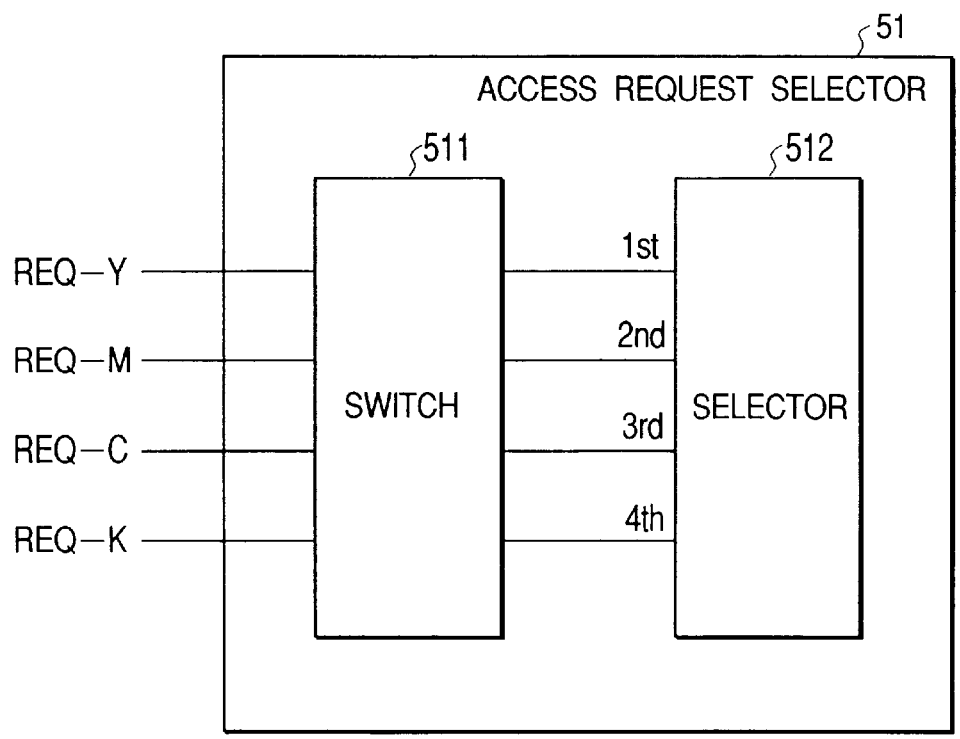
FIG. 5 is a diagram showing a prediction result of a development prediction time of print data of each band and each color in the embodiment.
FIG. 6 is a block diagram of an address request selector in the embodiment.

As for the prediction of the development time, for example, it is assumed that a table as shown in FIG. 5 was obtained in the normal mode. The longer the development time is, the higher the priority is. Therefore, in FIG. 5, the priorities in the first band are set to the order of K, C, M, and Y. The priorities in the second band are set to the order of K, Y, C, and M. The priorities in the third band are set to the order of M, Y, K, and C. Since the kinds of priorities are calculated by a permutation of four colors, 24 kinds of priorities exist.

Constructions of the priority retainer 54 and access request selector 51 will now be described. The priority retainer 54 retains the access priorities of the hard renderers of every band and is constructed by a register of 5 bits because there are 24 kinds of priorities.

The priority retainer 54 stores the development prediction time predicted by the CPU 31 every band. When the printing is started, the priority retainer 54 outputs data indicative of the priority of the first band to the access request selector 51. This output data is held until all of the processes for the first band are finished. When all of the processes for the first band are finished, the CPU 31 instructs the priority retainer 54 to output the data indicative of the priority of the second band to the access request selector 51.

As shown in FIG. 6, the access request selector 51 comprises: a switch 511 for rearranging the request signals from the hard renderers of Y, M, C, and K in priority order on the basis of the data showing the priorities from the priority retainer 54; and a selector 512 for deciding which one of request signals is selected when a plurality of request signals are transmitted. Outputs of the switch 511 are connected to 1st, 2nd, 3rd, and 4th input terminals of the selector 512 in order from the higher priority. The selector 512 selects a plurality of request signals and outputs them to the address selector 52 and data transmitter 53.

For example, in case of the first band in FIG. 5, since the priorities have been allocated to the output of the priority retainer 54 in order of K, C, M, and Y, the switch 511 connects the access request signal REQ-Y to the 4th input terminal, REQ-M to the 3rd input terminal, REQ-C to the 2nd input terminal, and REQ-K to the 1st input terminal. At a certain time point, when the requests of Y and M compete, the access request signal REQ-M is selected by the selector 512.

A flow of processes will be described. The printing process is started when such conditions that the display lists of all bands in one page are formed, the rasterization with respect to the band whose development prediction time is longer than the reference development time is finished, and the development prediction times of all of the remaining bands are shorter than the reference development time are satisfied. When the printing process is actually started, the CPU 31 first reads out the data of the access priority of the first band from the RAM 33 and writes it into the priority retainer 54. When the access requests from the renderers compete, the access request selector 51 selects the access request signal in accordance with the access priorities written in the priority retainer 54. Therefore, since the hard renderer in which the development prediction time of the bit map data is the longest preferentially develops the bit map data, a situation such that the actual development time in this hard renderer is longer than the predicted time is avoided.

Each time the processes of a certain band are finished, the CPU 31 reads out the priority data of the next band from the RAM 33 and updates the data in the priority retainer 54. That is, the access priority is not fixed as in the conventional apparatus but changed every band and every color in accordance with the development prediction time. Thus, the overrun is certainly prevented even when the access requests compete (when developing requests for developing the display list to the bit map data are simultaneously generated from a plurality of hard renderers).

In the case where the rendering of the first band of a certain color is finished and an access request for rendering of the second band is issued with respect to the priority for the access request, a situation such that this request competes with an access request for rendering of the first band of a different color is considered. In this case, the access request of an early band order is preferentially processed. For example, in case of FIG. 5, since the development of Y in the first band is finished early, a situation such that the rendering of the second band is executed for Y before the rendering of K is finished is considered. Although the access request to the display list of the first band of K and the access request to the display list of the second band of Y compete in this instance, the access request selector discriminates the number of bands of the access request of each color and selects the access request of K of the first band.

When the development prediction times are the same with regard to the priorities, the priorities are allocated as follows. For example, in the printer shown in FIG. 2 in the embodiment, assuming that the image forming order to form an image onto a recording medium such as print paper, OHP, or the like in the printer engine of each color is set to YMCK, since the image formation to the recording medium in case of Y is performed earliest and that in case of K is performed latest, the image formation of Y is preferentially performed. This is because since the recording medium passes first through the printer engine of Y when it moves from a paper feeding unit to a paper delivery unit, if the priority is given to K, there is a possibility that the image formation of Y is not in time, so that the occurrence of the overrun is considered. Therefore, when the development prediction times are the same or there is not a very large difference between the development times, the priorities are allocated in image forming order. This is not limited to the case where the development prediction times are the same but can be performed even in the case where there is not a very large difference between the development times. In the embodiment, it is assumed that the difference between the development times due to the image forming order is provided as a specific numerical value. FIG. 7 is a diagram showing a case where a difference of the image forming order is provided for the development prediction times in FIG. 5 and an additional time is added every 0.15 in order from the early image formation. That is, 0.45 is added to Y, 0.30 is added to M, and 0.15 is added to C. In the diagram, if the priorities are allocated in order of the development prediction time and, in case of the same development prediction time, in the image forming order, the priorities of the first band are set to Y, M, K, and C, the priorities of the second band are set to Y, K, C, and M, and the priorities of the third band are set to Y, M, C, and K.

On the basis of the priorities set as mentioned above, an access right to the display list is given to the renderer of each color and the rendering process to the bit map data based on the intermediate data is performed by the renderer of each color. The image forming process to the recording medium is executed by a plurality of printer engines in order of YCMK.

The image forming order changes depending on the printer engine or characteristics of the toner and is not limited to the order of YMCK as in the embodiment. There is also a printer in which images are formed in the order of CMYK or KYMC. The priorities responsive to the access requests of the renderers can be also allocated on the basis of the image forming order.

The invention is not limited to the foregoing embodiment but many variations and modifications are possible within a scope without departing from the spirit of the invention. For example, when the hard renderer (Y) 341 and hard renderer (M) 351 compete, the priorities can be also changed by a combination of sources whose access requests compete by such a method that the priority is given to the hard renderer (Y) 341 twice among three times and the priority is given to the hard renderer (M) 351 once among three times.

An allocating process of the hard renderer to the band will now be described.

Figure 9:
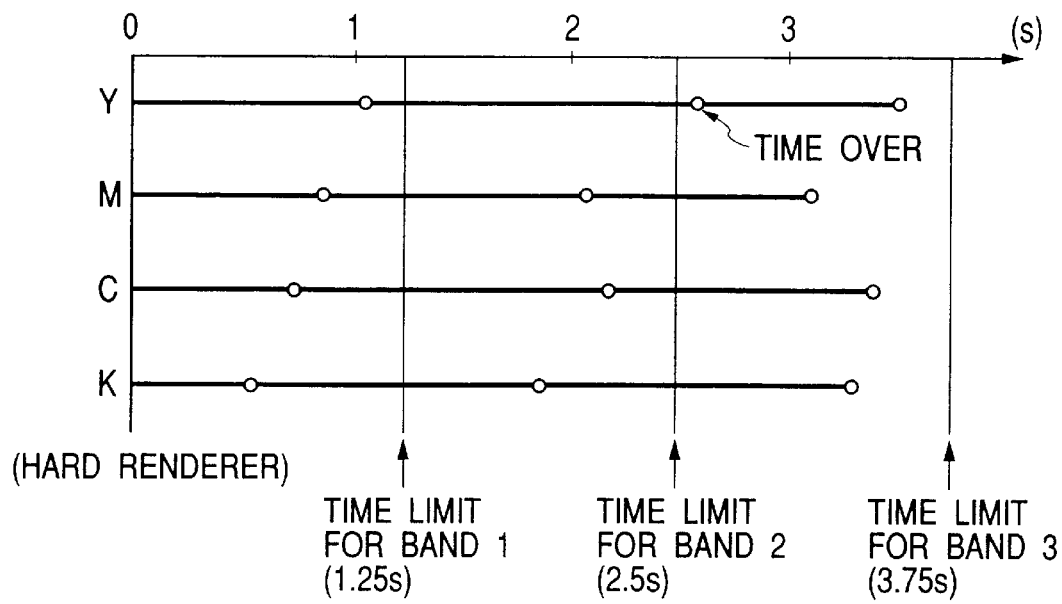
FIG. 9 is a time chart for conventional processes.

As mentioned above, it is assumed that one page is divided into three bands, the development time of the display list of each band and each color is predicted, and a predicted result as shown in FIG. 8 is obtained. In the embodiment, the developing process of the display list is independently performed by using the hard renderers 341, 351, 361, and 371 in FIG. 3. When the developing process of one band is finished, the developing process of the next band is subsequently performed. Therefore, a time chart for the developing process of each color is as shown in FIG. 9. According to FIG. 9, since the processing time of Y in the second band exceeds 2.5 seconds as a time limit, it is not in time for the developing process. In this case, if the printing is continued, since a correct print result is not obtained due to the time overrun, a resolution is deteriorated, the display list is developed to the bit map of a full page, and the printing is performed. Such a situation is avoided as follows in the present invention.

First, the CPU 31 converts the print data described by the page description language stored in the RAM 33 to a drawing code every band and predicts a development time every band and every color. A predicted result is as shown in FIG. 8. The CPU 31 decides to which hard renderer the developing process of which color is allocated every band.

An example of an allocating method will now be described hereinbelow.

Figure 10:
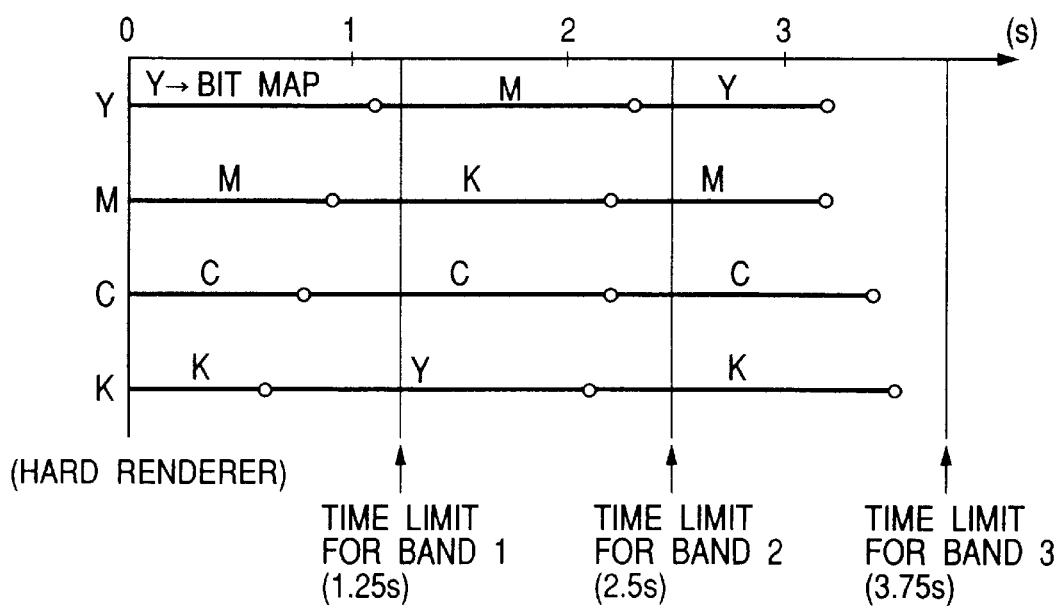
FIG. 10 is a time chart for processes in the embodiment.

First, as for the process of the first band, the developing process of each color is allocated to the corresponding hard renderer. As for the second band, subsequently, the developing process of the second band which requires the longest time is allocated to the hard renderer in which the processes for the first band are finished earliest. In the example of FIG. 8, the developing process of yellow (Y) is allocated to the hard renderer (K) 371. Similarly, the developing process of cyan (C) is allocated to the hard renderer (C) 361, the developing process of black (K) is allocated to the hard renderer (M) 351, and the developing process of magenta (M) is allocated to the hard renderer (Y) 341. By using a similar method to the processes of the third band, a time chart for the processes of the embodiment is as shown in FIG. 10. That is, in all bands, since the developing processing time of each color does not exceed the time limit, the printing can be executed at an engine resolution without deteriorating the resolution.

Specifically speaking, the CPU 31 transmits an allocation result of each band to the transmitter 39. When the hard renderers 341, 351, 361, and 371 write the bit map data into the band memories 342, 352, 362, and 372, the transmitter 39 converts write addresses so as to write the bit map data into the proper band memory on the basis of the allocation result of the CPU 31.

A processing flow for processes which are executed by the printer will now be described with reference to FIG. 11.

FIG. 11 is a flowchart showing the processing flow for the processes which are executed by the printer in the embodiment.

In step S101, the CPU 31 divides the print data into a plurality of bands page by page and converts the print data which is drawn in each band to a display list (drawing code) as intermediate data. Subsequently, in step S102, the CPU 31 calculates a development prediction time of the drawing code of each band and each color. In step S103, the CPU 31 determines the hard renderer to be used for development to the bit map data of the drawing code every color and every band on the basis of the predicted result. In step S104, the CPU 31 transmits the bit map data developed by each hard renderer to the band memory corresponding to each color by the transmitter 39.

As described above, according to the embodiment, the dedicated hard renderer is not always used for development of the print data of each color to the bit map data but the hard renderer to be used for development of the print data of each band is changed on the basis of the development prediction time of the print data every band and every color. Thus, a load on each hard renderer can be equivalently distributed and the printing can be efficiently executed without deteriorating the resolution of the printer engine.

The invention is not limited to the foregoing embodiment but many variations and modifications are possible within a scope without departing from the spirit of the invention. For example, in the invention, although the start times of the processes of the respective colors are the same, since the time that is required to print a certain point on a paper actually differs depending on each color (the paper sequentially passes through the engine for printing each color), after the time limit for the processes of each color is deviated, the allocation of the processes of each band and every color can be determined.

As the number of hard renderers, it can be less than the number corresponding to the number of image forming colors. It is also possible to use such a construction that there are three hard renderers for four colors of YMCK, these three hard renderers are allocated every band of the higher priority, and the image forming process is performed.

The invention can be also accomplished by a method whereby a memory medium storing program codes of software to realize the functions of the embodiment is supplied to a system or an apparatus and a computer (or a CPU or an MPU) of the system or apparatus reads out the program codes stored in the memory medium and executes them.

In this case, the program codes themselves read out from the memory medium realize the functions of the embodiment mentioned above and the memory medium in which the program codes have been stored constructs the invention.

As a memory medium to supply the program codes, for example, a floppy disk, a hard disk, an optical disk, a magnetooptic disk, a CD-ROM, a CD-R, a magnetic tape, a non-volatile memory card, an ROM, or the like can be used.

The invention also incorporates not only the case where the functions of the embodiment mentioned above are realized by executing the read-out program codes by the computer but also a case where the OS or the like operating on the computer executes a part or all of the actual processes on the basis of instructions of the program codes and the functions of the embodiment mentioned above are realized by those processes.

Further, the invention also incorporates a case where the program codes read out from the memory medium are written into a memory equipped for a function expanding board inserted in a computer or a function expanding unit connected to the computer and, after that, a CPU or the like equipped for the function expanding board or function expanding unit executes a part or all of the actual processes on the basis of instructions of the program codes, and the functions of the embodiment mentioned above are realized by those processes.

Program codes themselves which are installed in a computer in order to realize the functions and processes of the invention by the computer also realize the invention. That is, a computer program itself to realize the functions and processes of the invention is also incorporated in Claims of the invention.

A supplying method of the computer program is not limited to the case where the computer program is stored in an FD or a CD-ROM and it is read out by a computer and installed therein as mentioned above. The computer program can be also supplied by a method whereby a client computer is connected to a homepage of the Internet by using a browser of the client computer and the computer program itself of the invention is derived from the homepage or a compressed file including an automatic installing function is downloaded. The functions and processes of the invention can be also realized by a method whereby the program codes constructing the program of the invention are divided into a plurality of files and each file is downloaded from a different homepage. That is, a WWW server for downloading a program file to realize the functions and processes of the invention by the computer to a plurality of users is also incorporated in Claims of the invention.

The computer program can be also realized by a method whereby the program of the invention is enciphered and stored in a memory medium such as an FD or the like and distributed to the user, key information to decrypt the encipherment is downloaded from the homepage through the Internet to the users who cleared predetermined conditions, the enciphered program is executed by using the key information, and the program is installed into the computer.

As many apparently widely different embodiment of the present invention can be made without departing from the spirit and scope thereof, it is to be understood that the invention is not limited to the specific embodiment thereof except as defined in the appended claims.

As described in detail above, according to the invention, the time that is required when the display list is developed to the bit map data is predicted every band and every color, and in the case where at least two of a plurality of hard renderers simultaneously requested to obtain the display list of the same band, the priorities for the requests of the display lists are determined on the basis of the prediction development time of each color of the band which was predicted. Specifically speaking, on the basis of the prediction development time of each band and each color which was predicted, the priorities are allocated so as to allocate the higher priority to the longer prediction development time of each color every band.

Consequently, since the highest priority is set to the hard renderer in which the longest time is required for the bit map data development with respect to each band, the requests are not made to wait when the accesses compete, so that the occurrence of the overrun is prevented.

What is claimed is:

1. A print control apparatus for forming bit map data to be outputted to a plurality of printer engines corresponding to respective colors, comprising:

analyzing means for dividing print data described by a page description language into a plurality of bands of respective different colors and forming a display list of an intermediate data format color by color into a memory band by band;

development time calculating means for calculating a development prediction time which is required when developing into bit map data on the basis of said display list band by band and color by color;

a plurality of developing means each for developing data of a respective color into bit map data band by band on the basis of said display list; and arbitrating means for, in a case where access requests to the memory in which said display lists have been stored are issued from at least two of said plurality of developing means, arbitrating the access requests in accordance with priorities for the access requests to the memory which are determined on the basis of the development prediction time calculated by said development time calculating means, wherein said plurality of developing means develop the data into bit map data color by color and band by band in any sequential order, the sequential order being determined on the basis of an arbitration result obtained by said arbitrating means.

2. An apparatus according to claim 1, wherein said developing means are each a hard renderer.

3. An apparatus according to claim 1, further comprising priority deciding means for deciding the priorities for the access requests to the memory on the basis of the development prediction time calculated by said development time calculating means, and wherein said priority deciding means further decides said priorities in accordance with an image forming order of said plurality of printer engines.

4. An apparatus according to claim 1, wherein said print control apparatus controls a printer of a tandem system having a plurality of printer engines corresponding to four colors of yellow (Y), magenta (M), cyan (C), and black (K).

5. An apparatus according to claim 1, further comprising development memories for storing the bit map data formed by said plurality of developing means, and wherein each of said plurality of developing means stores the formed bit map data into the corresponding development memory and transmits the bit map data stored in said development memory to the printer engine to output it in a corresponding color.

6. An apparatus according to claim 1, further comprising allocating means for allocating the developing means to be used for development of the display list of each color from said plurality of developing means on the basis of the development prediction time calculated by said development time calculating means.

7. An apparatus according to claim 6, wherein said allocating means allocates the developing means in which the development time of the nth display list is the shortest to the developing means to be used for development of the display list of the longest development time among said (n+1)th display lists of each color.

8. A print control method for use in a print control apparatus which has a plurality of developing means for developing data of a respective color into bit map data band by band on the basis of display lists and forms bit map data to be outputted to a plurality of printer engines corresponding to a plurality of colors, said method comprising:

an analyzing step, of dividing print data described by a page description language into a plurality of bands of respective different colors and forming a display list of an intermediate data format color by color into a memory band by band;

a development time calculating step, of calculating a development prediction time which is required when developing into the bit map data on the basis of the display list every band by band and color by color; and an arbitrating step, of, in a case where access requests to the memory in which the display lists have been stored are issued from at least two of the plurality of developing means, arbitrating the access requests in accordance with priorities for the access requests to the memory which are determined on the basis of the development prediction time calculated in said development time calculating step, wherein the plurality of developing means develop the data into bit map data color by color and band by band in any sequential order, the sequential order being determined on the basis of an arbitration result obtained in said arbitrating step.

9. A method according to claim 8, wherein each of the developing means is a hard renderer.

10. A method according to claim 8, further comprising a priority deciding step, of deciding the priorities for the access requests to the memory on the basis of the development prediction time calculated in said development time calculating step, and wherein in said priority deciding step, the priorities are further decided in accordance with an image forming order of the plurality of printer engines.

11. A method according to claim 8, wherein the print control apparatus controls a printer of a tandem system having a plurality of printer engines corresponding to four colors of yellow (Y), magenta (M), cyan (C), and black (K).

12. A method according to claim 8, wherein the print control apparatus further includes development memories for storing the bit map data formed by the plurality of developing means, and each of the plurality of developing means stores the formed bit map data into the corresponding development memory and transmits the bit map data stored in the development memory to the printer engine to output it in a corresponding color.

13. A method according to claim 8, further comprising an allocating step, of allocating the developing means to be used for development of the display list of each color from the plurality of developing means on the basis of the development prediction time calculated in said development time calculating step.

14. A method according to claim 13, wherein in said allocating step, the developing means in which the development time of the nth display list is the shortest is allocated to the developing means to be used for development of the display list of the longest development time among said (n+1)th display lists of each color.

15. A computer-readable memory medium which stores a program for controlling a print control apparatus which has a plurality of developing means for developing data of a respective color into bit map data band by band on the basis of display lists and forms bit map data to be outputted to a plurality of printer engines corresponding to a plurality of colors, wherein said program comprises:

an analyzing step, of dividing print data described by a page description language into a plurality of bands of respective different colors and forming a display list of an intermediate data format color by color into a memory band by band;

a development time calculating step, of calculating a development prediction time which is required when developing into the bit map data on the basis of the display list band by band and color by color; and an arbitrating step, of, in the case where access requests to the memory in which the display lists have been stored are issued from at least two of the plurality of developing means, arbitrating the access requests in accordance with priorities for the access requests to the memory which are determined on the basis of the development prediction time calculated in said development time calculating step, wherein the plurality of developing means develop into the bit map data color by color and band by band in any sequential order, the sequential order being determined on the basis of an arbitration result obtained in said arbitrating step.

16. A print control apparatus for forming bit data to be outputted in a plurality of printer engines corresponding to respective colors, comprising:

a plurality of developing means each for developing a respective color of drawing data constructed by a plurality of colors into bit map data;

memory means for storing the bit map data developed by said plurality of developing means into memories color by color;

predicting means for predicting a development time when the drawing data of each color in the drawing data is divided into predetermined units and subsequently developed into the bit map data;

deciding means for deciding the developing means to be used for development of the drawing data of each color from said plurality of developing means on the basis of a predicted result of said predicting means; and transmitting means for transmitting the bit map data developed by said developing means decided by said deciding means to memories corresponding respectively to each color, wherein said plurality of developing means develop the drawing data into a bit map data color by color and band by band in any sequential order, the sequential order being determined on the basis of a decision result obtained by said deciding means.

17. An apparatus according to claim 16, wherein said deciding means decides the developing means in which the development time of the nth drawing data is the shortest as the developing means to be used for development of the drawing data of the longest development time among said (n+1)th drawing data of each color.

18. An apparatus according to claim 16, wherein each of said plurality of developing means is dedicated developing means for developing the drawing data of a predetermined color into the bit map data.

19. An apparatus according to claim 16, wherein said predetermined unit is one page.

20. An apparatus according to claim 16, wherein said plurality of colors include yellow (Y), magenta (M), cyan (C), and black (K).

21. An apparatus according to claim 16, wherein each of the memories is a band memory for storing the bit map data of a predetermined color.

22. An apparatus according to claim 16, further comprising a plurality of printer engines each for printing the drawing data of each color, and wherein said transmitting means transmits the bit map data of each color stored in the memories to said corresponding printer engine.

23. A print control method for use in a print control apparatus having a plurality of developing means each for developing a respective color of drawing data constructed by a plurality of colors into bit map data, said method comprising:

a memory step, of storing the bit map data developed by the plurality of developing means into memories color by color;

a predicting step, of predicting a development time when the drawing data of each color in the drawing data is divided into predetermined units and subsequently developed into bit map data;

a deciding step, of deciding the developing means to be used for development of the drawing data of each color from among the plurality of developing means on the basis of a predicted result obtained in said predicting step; and a transmitting step, of transmitting the bit map data developed by the developing means decided in said deciding step to a respective one of the memories corresponding to each the color in question, wherein the plurality of developing means develop the drawing data into a bit map data color by color and band by band in any sequential order, the sequential order being determined on the basis of a decision result obtained in said deciding step.

24. A method according to claim 23, wherein in said deciding step, the developing means in which the development time of the nth drawing data is the shortest is decided as the developing means to be used for development of the drawing data of the longest development time among said (n+1)th drawing data of each color.

25. A method according to claim 23, wherein each of the plurality of developing means is dedicated developing means for developing the drawing data of a predetermined color into the bit map data.

26. A method according to claim 23, wherein said predetermined unit is one page.

27. A method according to claim 23, wherein the plurality of colors include yellow (Y), magenta (M), cyan (C), and black (K).

28. A method according to claim 23, wherein each memory is a band memory for storing the bit map data of a predetermined color.

29. A method according to claim 23, wherein the print control apparatus further comprises a plurality of printer engines each for printing the drawing data of each color, and in said transmitting step, the bit map data of each color stored in memory is transmitted to the corresponding printer engine.

30. A computer-readable memory medium which stores a program for controlling a print control apparatus having a plurality of developing means each for developing a respective color of drawing data constructed by a plurality of colors into bit map data, said program comprising:

a memory step, of storing the bit map data developed by the plurality of developing means into memories color by color;

a predicting step, of predicting a development time when the drawing data of each color in the drawing data is divided into predetermined units and subsequently developed into the bit map data;

a deciding step, of deciding the developing means to be used to for development of the drawing data of each color from the plurality of developing means on the basis of a predicted result obtained in said predicting step; and a transmitting step, of transmitting the bit map data developed by the developing means decided in said deciding step to the respective memory corresponding to each the color in question, wherein the plurality of developing means develop the drawing data into a bit map data color by color and band by band in any sequential order, the sequential order being determined on the basis of a decision result obtained in said deciding step.

* * * * *

UNITED STATES PATENT AND TRADEMARK OFFICE
CERTIFICATE OF CORRECTION

PATENT NO. : 6,819,447 B1
DATED : November 16, 2004
INVENTOR(S) : Yasuaki Sawano It is certified that error appears in the above-identified patent and that said Letters Patent is hereby corrected as shown below:

<u>Title page,</u>
Item [57], ABSTRACT,
Line 7, "predicted" should read -- predicted for --; and
Line 8, "allocated" should read -- allocated to --.

<u>Column 14,</u>
Line 47, "each" should be deleted.

<u>Column 16,</u>
Line 12, "each" should be deleted.

Signed and Sealed this

Twenty-eighth Day of June, 2005

JON W. DUDAS
*Director of the United States Patent and Trademark Office*